United States Patent
Zou et al.

(10) Patent No.: US 10,376,796 B2
(45) Date of Patent: Aug. 13, 2019

(54) MESSAGE PROCESSING METHOD AND TERMINAL DEVICE

(71) Applicant: Tencent Technology (Shenzhen) Company Limited, Shenzhen (CN)

(72) Inventors: Ming Zou, Shenzhen (CN); Zheng Zhang, Shenzhen (CN); Zhenchao Ru, Shenzhen (CN); Bailin An, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 887 days.

(21) Appl. No.: 14/974,510

(22) Filed: Dec. 18, 2015

(65) Prior Publication Data
US 2016/0101363 A1 Apr. 14, 2016

Related U.S. Application Data

(63) Continuation of application No. PCT/CN2015/074929, filed on Mar. 24, 2015.

(30) Foreign Application Priority Data

Mar. 18, 2014 (CN) .......................... 2014 1 0101740

(51) Int. Cl.
G09G 5/00 (2006.01)
A63F 13/87 (2014.01)
G06F 9/451 (2018.01)

(52) U.S. Cl.
CPC .............. *A63F 13/87* (2014.09); *G06F 9/451* (2018.02)

(58) Field of Classification Search
CPC ....... G06T 19/006; G06T 19/00; G06F 3/011; G06F 3/012; G02B 27/017
USPC .......................................................... 345/633
See application file for complete search history.

(56) References Cited

U.S. PATENT DOCUMENTS

| | | | |
|---|---|---|---|
| 2003/0045355 A1* | 3/2003 | Comair .................. | A63F 13/02 463/40 |
| 2004/0259637 A1* | 12/2004 | Kimura .................. | A63F 13/10 463/31 |
| 2008/0224399 A1* | 9/2008 | Schambelan ....... | A63F 3/00006 273/261 |
| 2013/0321257 A1 | 12/2013 | Moore et al. | |

FOREIGN PATENT DOCUMENTS

| CN | 101788909 | 7/2010 |
|---|---|---|
| CN | 102387132 | 3/2012 |

\* cited by examiner

*Primary Examiner* — Gordon G Liu
(74) *Attorney, Agent, or Firm* — Emerson, Thomson & Bennett, LLC; Roger D. Emerson

(57) ABSTRACT

The present disclosure discloses a message processing method and terminal device. The method includes: receiving a first message that carries displacement parameters and is sent by a client, the displacement parameters being generated by the client and used to indicate displacement of a virtual object in a virtual space; determining, according to the displacement parameters, whether the displacement conforms to a preset rule; and sending, if it is determined that the displacement does not conform to the preset rule, a second message used by the client to refuse the displacement. The present disclosure solves the technical problem in the existing technology that multiple terminal device resources need to be occupied to ensure appropriate movement of a virtual object.

18 Claims, 4 Drawing Sheets

MESSAGE PROCESSING METHOD AND TERMINAL DEVICE

CROSS REFERENCE TO RELATED APPLICATION

This application is a continuation of International Application No. PCT/CN2015/074929, filed on Mar. 24, 2015, which claims priority to Chinese patent application No. 201410101740.4, filed on Mar. 18, 2014, the content of which are incorporated herein by reference in their entirety.

FIELD OF THE TECHNOLOGY

The present disclosure relates to the field of Internet applications, and in particular, to a message processing method and terminal device.

BACKGROUND OF THE DISCLOSURE

In the existing technology, modeling calculation of a virtual object in a virtual space is generally implemented by using a 3D engine. However, a traditional 3D engine is developed mainly for a standalone game client or a client game client, which is, in other words, developed mainly according to manifestation of a client. Therefore, the traditional 3D engine requires high-precision model calculation and a large calculation amount, for example, the traditional 3D engine generally outlines the virtual object by using a large number of polygons. Because collision detection is achieved on the basis of a model, if the traditional 3D engine is migrated to a server and logic of the collision detection is achieved on the basis of the migration, multiple server resources are occupied, which results in reduction in maintainability and a bearing capacity. For example, after some common physical engines are migrated to a server, one B6 machine can only bear 500 to 600 users.

A concept of another solution is that related calculation logic is wholly set in a client, and the server trusts the client completely or only performs limited verifications, for example, the server moderately extracts some logic and also performs calculation, and then compares a calculation result with a result uploaded by the client, to determine whether the virtual object has an abnormal action. However, the detection manner based on sampling calculation cannot ensure reliability of the whole calculation logic. Therefore, the logic is easily used by a tag-on service, and moreover, normal operations of a user also likely cause an abnormal displacement result. In other words, in the existing solution, multiple server resources need to be occupied to ensure appropriate movement of a virtual object, and cannot ensure reliability of movement logic and collision detection logic in the case of a reduced server pressure.

Effective solutions have not been proposed for the foregoing problems.

SUMMARY

Embodiments of the present invention provide a message processing method and terminal device, so as to at least solve the technical problem in the existing technology that multiple terminal device resources need to be occupied to ensure appropriate movement of a virtual object.

According to one aspect of the embodiments of the present invention, a message processing method is provided, including: receiving a first message that carries displacement parameters and is sent by a client, the displacement parameters being generated by the client and indicating displacement of a virtual object in a virtual space; determining, according to the displacement parameters, whether the displacement conforms to a preset rule; and sending, if it is determined that the displacement does not conform to the preset rule, a second message used by the client to refuse the displacement.

According to another aspect of the embodiments of the present invention, a message processing apparatus is provided, including: a receiving unit, configured to receive a first message that carries displacement parameters and is sent by a client, the displacement parameters being generated by the client and indicating displacement of a virtual object in a virtual space; a determining unit, configured to determine, according to the displacement parameters, whether the displacement conforms to a preset rule; and a sending unit, configured to send, if it is determined that the displacement does not conform to the preset rule, a second message used by the client to refuse the displacement.

In the embodiments of the present invention, fine modeling calculation, for a virtual space, that determines image manifestation and occupies multiple processing resources and storage resources, and collision detection calculation for a virtual object are implemented by a client, and the client uploads displacement parameters related to movement of the virtual object in the virtual space, so that corresponding data at the side of a terminal device is updated. The terminal device only needs to store a relatively rough modeling result; and can determine, by processing a first message that carries the displacement parameters and is uploaded by the client, whether a displacement result calculated by the client conforms to a preset rule corresponding to the rough modeling result, and when determining that the displacement result does not conform to the preset rule, refuses the displacement result calculated by the client.

As can be seen, in the embodiments of the present invention, the terminal device only needs to ensure "security" and "reliability" of movement logic of the virtual object in the virtual space, and does not need to ensure "realness" presented by collided images. In this way, without occupation of excessive terminal device resources, abnormal movement of the virtual object caused, for example, by malicious modification at the client is avoided, thereby solving the technical problem in the existing technology that multiple terminal device resources need to be occupied to ensure appropriate movement of the virtual object.

BRIEF DESCRIPTION OF THE DRAWINGS

The accompanying drawings are included to provide a further understanding of the present disclosure, and constitute a part of this application. The exemplary embodiments and the illustrations of the present disclosure are only intended to explain the present disclosure, rather than to limit the present disclosure. In the accompanying drawings.

DESCRIPTION OF EMBODIMENTS

To make a person skilled in the art better understand the solution of the present disclosure, the technical solution of the present disclosure will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present disclosure.

It should be noted that, in the specification, claims, and the foregoing accompanying drawings of the present disclosure, the terms "first", "second", and the like are used to distinguish similar objects, and are not necessarily used for describing a specific order or sequence. It should be understood that, the terms used in this manner can be interchanged, so that the embodiments of the present invention described herein can be implemented, for example, in other sequences than those shown or described herein. In addition, the terms "include", "contain" or any other variation thereof, are intended to cover a non-exclusive inclusion, for example, a process, a method, a system, a product or a device that includes a series of steps or units is not limited to including only those explicitly listed steps or units but may include other steps or units that are not explicitly listed, or inherent to the process, method, product, or device.

Figure 1:
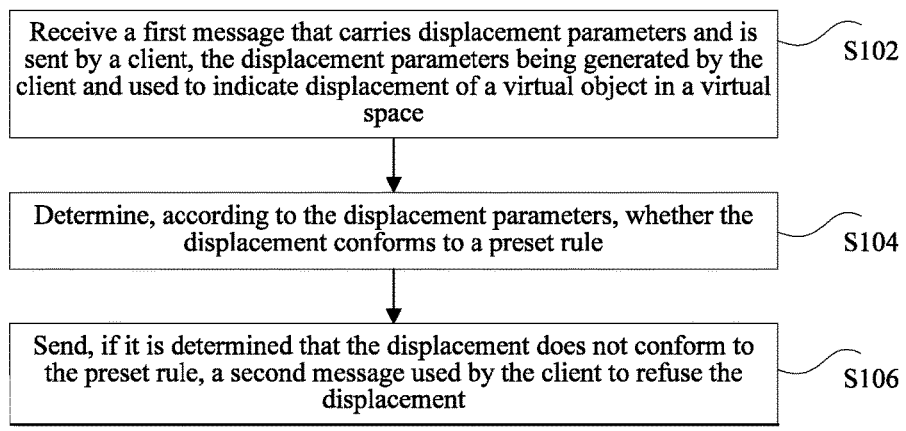
FIG. 1 is a schematic diagram of a message processing method according to an embodiment of the present invention.

According to an embodiment of the present invention, a message processing method is provided. As shown in FIG. 1, the method includes:

S102: Receive a first message that carries displacement parameters and is sent by a client, the displacement parameters being generated by the client and used to indicate displacement of a virtual object in a virtual space.

S104: Determine, according to the displacement parameters, whether the displacement conforms to a preset rule.

S106: Send, if it is determined that the displacement does not conform to the preset rule, a second message used by the client to refuse the displacement.

It should be noted that, one of problems to be solved by the technical solution of the present disclosure is to provide a message processing method, so as to restrict possible abnormal movement of a virtual object in a virtual space that is maintained by a terminal device, for example, a server, and loaded by a client. The client may refer to a physical device that is connected to a terminal device and requests from the terminal device a service related to the virtual space and the virtual object, such as, a personal computer serving as a fixed terminal, or a smart phone or a tablet computer serving as a mobile terminal; or the client may also refer to a client application running on the physical device or a system thereof, such as, a game client, which does not affect understanding and implementation of the technical solution of the present disclosure and achievement of the technical effect of the technical solution; and the present disclosure is not limited thereto.

In the existing technology, modeling calculation of a virtual object in a virtual space is generally implemented by using a 3D engine. However, a traditional 3D engine is developed mainly for a standalone game client or a client game client, which is, in other words, developed mainly according to manifestation of a client. Therefore, the traditional 3D engine requires high-precision model calculation and a large calculation amount, for example, the traditional 3D engine generally outlines the virtual object by using a large number of polygons. Because collision detection is achieved on the basis of a model, if the traditional 3D engine is migrated to a terminal device and logic of the collision detection is achieved on the basis of the migration, multiple terminal device resources are occupied, which results in reduction in maintainability and a bearing capacity. For example, after some common physical engines are migrated to a terminal device, one B6 machine can only bear 500 to 600 users.

A concept of another existing solution is that related calculation logic is wholly set in a client, and the terminal device trusts the client completely or only performs limited verifications, for example, the terminal device moderately extracts some logic and also performs calculation, and then compares a calculation result with a result uploaded by the client, to determine whether the virtual object has an abnormal action. However, the detection manner based on sampling calculation cannot ensure reliability of the whole calculation logic. Therefore, the logic is easily used by a tag-on service, and moreover, normal operations of a user also likely cause an abnormal displacement result. In other words, in the existing solution, multiple terminal device resources need to be occupied to ensure appropriate movement of a virtual object, and cannot ensure reliability of movement logic and collision detection logic in the case of a reduced terminal device pressure.

To solve the foregoing problems, in the embodiment of the present invention, fine modeling calculation that determines image manifestation and occupies multiple processing resources and storage resources, and collision detection logic are implemented by a client, and the client uploads displacement parameters related to movement of the virtual object in the virtual space, to update data at the side of the terminal device. However, the terminal device does not completely trust information uploaded by the client, but processes, by using relatively unsophisticated detection logic, a first message that carries the displacement parameters and is uploaded by the client, further determines whether a displacement result calculated by the client conforms to a coarse preset rule, and when it is determined that the displacement result does not conform to the preset rule, refuses the displacement result calculated by the client.

As can be seen, in the embodiment of the present invention, the terminal device only needs to ensure "security" and "reliability" of movement logic of the virtual object in the virtual space, and does not need to ensure "realness" presented by collided images. In this way, without occupation of excessive terminal device resources, abnormal movement of the virtual object caused, for example, by malicious modification at the client is avoided, thereby solving the technical problem in the existing technology that multiple terminal device resources need to be occupied to ensure appropriate movement of the virtual object.

The technical solution and working principles of the present disclosure are described below with reference to the accompanying drawings and specific embodiments.

According to the processing method provided by the embodiment of the present invention, in step S102, a terminal device may receive a first message that carries displacement parameters and is sent by a client, where the displacement parameters are generated by the client and used to indicate displacement of a virtual object in a virtual space.

In the embodiment of the present invention, because the displacement parameters are generated by the client, fine modeling calculation and collision logic detection may be implemented by using a traditional 3D engine running on the client. On such a basis, the client obtains, through calculation according to operating instructions input by a user, that necessary displacement parameters need to be further sent to the terminal device if the virtual object needs to move in the virtual space, so that the terminal device determines, according to the displacement parameters, whether the displacement of the virtual object conforms to a preset rule set by a game developer.

Specifically, the displacement parameters may generally include a parameter indicating a starting point position of the displacement and a parameter indicating an end point position of the displacement, and therefore the displacement may also be regarded as uploading of vector information. However, the present disclosure is not limited thereto. For example, in some embodiments of the present invention, the first message sent by the client may also only carry the parameter indicating an end point position of the displacement; in this way, the terminal device may determine, with reference to a position record stored in the terminal device and uploaded by the client in advance, how displacement that is requested by the client in current uploading is performed. In addition, in the embodiment of the present invention, a specific manner of receiving, by the terminal device, the first message sent by the client may be selected from manners known by a person skilled in the art, which is not described in detail herein by the present disclosure.

Certainly, the foregoing is merely exemplary description, and does not constitute any unnecessary limitation to the present disclosure. For example, in some embodiments of the present invention, the virtual space is not necessarily a three-dimensional space, and for the terminal device that maintains a two-dimensional scenario, an elaborate scenario description and unsophisticated detection logic may still be separated in implementation, and are respectively implemented by the client and the terminal device, to achieve effects of ensuring logic reliability and reducing a processing pressure of the terminal device. However, the present disclosure is not limited thereto.

Further, according to the processing method provided by the embodiment of the present invention, in step S104, it may be determined, according to the displacement parameters, whether displacement requested by a client conforms to a preset rule. The preset rule is generally a rule that is set by a developer, a manager, or a maintainer of the virtual space and movement of the virtual object in the virtual space should obey. For example, for some virtual spaces that simulate reality, when a virtual person as the virtual object walks to a barrier in the virtual space, the virtual person cannot continue to move forward as usual, and therefore, one of formed preset rules may be that "the virtual object cannot continuously move towards the inside of a barrier when moving to the barrier" or "an end point of displacement requested by a client shall not fall inside a barrier".

It should be understood that, in the embodiment of the present invention, on the basis of related instructions and as an appropriate selection of a person skilled in the art, detection logic, for movement and collision feasibility, of which the sophistication is far lower than that at the side of the client may be generally set at the side of the terminal device. For example, generally, because a relatively fine "real" three-dimensional scenario does not need to be restored at the side of the terminal device, the terminal device does not need to perform a large amount of modeling calculation by using a traditional 3D engine and further does not need to implement complicated collision detection on the basis of a fine model. In the embodiment of the present invention, when it is determined whether the displacement requested by the client is appropriate, the modeling calculation may be completely simplified. That is, compared with the client, the terminal device does not need to ensure that the movement of the virtual object in the virtual space perfectly matches the acceptance level of the human vision, and only needs to ensure, through rough modeling calculation, that the virtual object does not move at excessively large deviation in the virtual space or a coarse virtual space.

For example, as a feasible implementation manner, the client can only upload a position of a central point of a virtual object, and does not need to upload an outline of the virtual object, that is, only upload starting point coordinates and end point coordinates of the central point of the virtual object. In such a manner, the terminal device can completely omit modeling for the virtual object, and by means of such improvement, the processing efficiency of the terminal device is obviously enhanced in maintaining a virtual space accommodating a large number of virtual objects.

Certainly, the foregoing is one of fundamental implementation manners of the present disclosure, and does not constitute a limitation to the present disclosure. For example, in some embodiments of the present invention, the landform in the virtual space may be further coarsened, for example, discretization processing is performed on a continuous curved surface serving as a boundary, to form a surface of a block shape, or the like.

As a more preferred manner, in the embodiment of the present invention, the foregoing step S104 may include:

S2: Search for first block properties and second block properties according to the displacement parameters.

S4: Acquire the first block properties and the second block properties from the displacement parameters.

S6: Determine, according to the first block properties and the second block properties, whether the displacement conforms to the preset rule.

The first block properties are properties of a first block in which a starting point of the displacement is located, and the second block properties are properties of a second block in which an end point of the displacement is located. Multiple blocks including the first block and the second block are used to divide the virtual space in a horizontal direction, and the size of each of the multiple blocks is greater than a minimum moving distance of the virtual object in the virtual space.

In the foregoing manner, in the embodiment of the present invention, for processing logic of displacement that is performed by the terminal device and requested by the client, an object to be determined by the terminal device is further optimized from the position of a central point of the virtual object into blocks in which the virtual object is located, where the blocks are specifically a first block in which a starting point of the displacement requested by the client is located and a second block in which an end point of the displacement is located, and then the complicated displacement condition requested by the client is simplified into displacement from the first block to the second block; and finally, it is determined whether the simplified displacement conforms to the preset rule. In other words, in the embodiment of the present invention, before determining the displacement of the virtual object, the terminal device discretizes starting points of the displacement and end points of the displacement that are continuously distributed in the virtual space, thereby greatly reducing the calculation amount of movement feasibility calculation and collision detection calculation.

Specifically, in the embodiment of the present invention, the properties of the first block and the properties of the second block may be obtained in step S2 or step S4, which may be recorded as first block properties and second block properties; and then in step S6, it is determined, according to the first block properties and the second block properties, whether the displacement requested by the client conforms to the preset rule. The block property may be height information of a block, or may also be barring information of a block, and a specific implementation manner thereof will be described in detail in a subsequent embodiment.

In the embodiment of the present invention, the foregoing step S2 may include:

S8: Search for data records corresponding to an identification item of the first block and use the data records as the first block properties, and search for data records corresponding to an identification item of the second block and use the data records as the second block properties, where the displacement parameters include the identification items and the identification items include block IDs and block coordinates.

In addition, the foregoing step S4 may include:

S10: Acquire the first block properties and the second block properties that are added by the client to the displacement parameters in advance.

In the embodiment of the present invention, the terminal device may store properties of all blocks in the virtual space in a database in advance, and after receiving a first message sent by the client, search for a corresponding data record according to a block ID or block coordinates, that are sent by the client, of the starting point of the displacement, thereby further simplifying the processing logic of the terminal device and accelerating the processing. These blocks may also be stored in the database in a coordinate sequence, so as to accelerate the search.

Certainly, in some embodiments of the present invention, the client may also directly add the block properties to the first message and send the first message to the terminal device, and in this way, a search operation is also transferred to the side of the client, thereby further reducing occupation of the terminal device resources.

More specifically, as an optional manner, in the embodiment of the present invention, the foregoing step S4 may include:

S12: Determine whether a difference between a height property in the second block properties and a height property in the first block properties is greater than a first preset threshold, where a height property of any block in the multiple blocks indicates a height value that is preset for the block.

S14: Determine, if the difference is greater than the first preset threshold, that the displacement does not conform to the preset rule.

In the embodiment of the present invention, one block may only correspond to one height property. That is, no matter what position, in a certain block, a starting point or an end point of the displacement is located, when the terminal device determines the displacement, the same height property of the block is used in all cases. When it is determined that a difference between a height of the second block in which the end point of the displacement is located and a height of the first block in which the starting point of the displacement is located exceeds a certain preset threshold, it may be determined that occurrence of the displacement is impossible, and correspondingly, in a three-dimensional scenario, the virtual object cannot climb up to an excessively high position during one movement.

Correspondingly, in the embodiment of the present invention, before step S102, the foregoing processing method may further include:

S16: Acquire an average height value of a region that corresponds to any block and is obtained by dividing the virtual space.

S18: Set the average height value as a height property of the block.

In this manner, a block corresponding to a certain landform region, such as a slope, in the virtual space is fitted into an average height value of all coordinates on the slope or an average value of multiple coordinates on the Z axis, and then the average height value or the average value is used as a height property of the block, so that the condition is relatively close to an actual condition in a virtual world.

In addition, as another optional manner, in the embodiment of the present invention, the foregoing step S4 may further include:

S20: Determine whether a type property in the second block properties is a barring type.

S22: Determine, if the type property is the barring type, that the displacement does not conform to the preset rule.

In the embodiment of the present invention, when a region, corresponding to the second block, in the virtual space is a barring area or a region that the virtual object is forbidden to pass through, a type property of the second block may be preset as a barring type; or otherwise, may be preset as a non-barring type. In this manner, the collision detection logic that keeps the virtual object out of a barrier can be achieved.

Further, in the embodiment of the present invention, step S22 of determining that the displacement does not conform to the preset rule may further include:

S24: Determine whether the multiple blocks include a third block that is stacked on the second block in a vertical direction.

S26: Determine, if there is the third block, whether a difference between a height property in properties of the third block and the height property in the first block properties is greater than a second preset threshold, where a height property corresponding to any block in the multiple blocks indicates a height value that is preset for the block; and determine, if the difference is greater than the second preset threshold, that the displacement does not conform to the preset rule.

S28: Determine, if there is no third block, that the displacement does not conform to the preset rule.

In the foregoing scenario, it is equivalent that accessible landform regions, in a virtual space, indicated by the blocks in the horizontal direction are spliced, and when the virtual object requests to move to the second block of a barring type, it may be further determined whether there is a third block that is stacked on and "communicated" with the second block. For example, in some embodiments of the present invention, the third block may be laid on top of the second block, and the second block and the third block are separately on a different block layer, so that the virtual object can move through blocks on different block layers. In this manner, the terminal device can only store blocks that correspond to one layer or multiple layers of accessible landform surfaces and boundary regions between different layers of landform surfaces in the virtual space, thereby further reducing occupation of the terminal device resources, and accelerating the search for the block properties.

Figure 2:
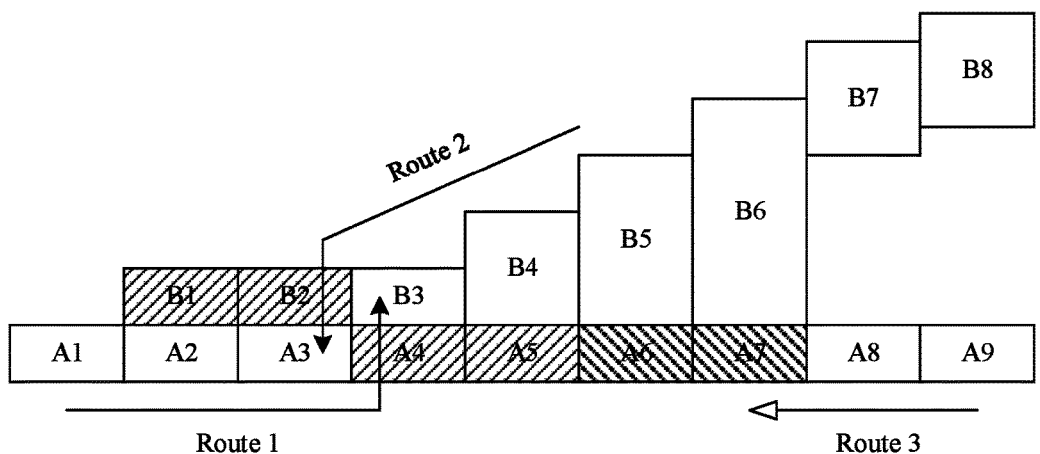
FIG. 2 is a schematic diagram of a partial region in a virtual space according to an embodiment of the present invention.

The technical solution of the present disclosure is described in detail below with reference to the accompanying drawings and more specific embodiments. For example, as an optional manner, in an embodiment of the present invention, a block division manner shown in FIG. 2 may be used. FIG. 2 is a longitudinal sectional diagram presented after the side of the terminal device divides a region near an "arch bridge" in a virtual space into blocks.

As shown in FIG. 2, in this embodiment, the region representing the "ground" in the virtual space is divided into horizontally arranged blocks A1 to A9, and the region representing the "arch bridge" in the virtual space is divided into blocks B1 to B8 also in the horizontal direction. In the foregoing scenario, according to the processing method provided by the embodiment of the present invention, after receiving a message that is sent by the client and used to request the virtual object to move in the space, the terminal device may determine a specific first block from which the virtual object that moves in the region shown in FIG. 2 moves and a specific second block to which the virtual object moves. For example, when a virtual person as the virtual object needs to walk rightwards from the ground at the left side in FIG. 2 up to the bridge, a starting point of displacement, initiated by the client, of the virtual person may be located in the block A3, and an end point of the displacement may be located in the block B3; in this way, the terminal device may determine, according to properties of the block A3 and properties of the block B3, whether the displacement from A3 to B3 conforms to a preset rule, and then determine, according to the foregoing determining result, whether occurrence of the current displacement initiated by the client is possible.

In this embodiment, the region in the virtual space shown in FIG. 2 is discretized into multiple blocks of large size, and landform information of the region of this part is simulated according to pre-defined properties of these blocks, which is equivalent that a model of a coarse virtual space is established at the side of the terminal device; and then it may be determined, according to a modeling result, whether movement of the virtual person is appropriate. For example, heights of the blocks B1 to B8 that are used to simulate the bridge are generally higher than the blocks A1 to A8 that are used to simulate the ground, and the height of the block B8 at the center of the arch bridge is higher than heights of the blocks B1 to B3 at one side of the arch bridge. If the preset rule sets that a different between a height property of the second block and a height property of the first block is less than or equal to a certain threshold, when the client requests to initiate movement, similar to "walking up to the bridge", of the virtual person, it is determined whether the displacement conforms to the preset rule, to limit the virtual person with an insufficient "climbing capability" to walk from one side of the bridge to the center of the bridge. This movement limitation generally cannot completely achieve a movement limitation effect of the "real" bridge with a relatively smooth floor in the virtual space on a person walking on the bridge, which however does not affect movement manifestation presented by the client to the user; because more sophisticated movement logic and collision detection logic are achieved at the side of the client, the side of the terminal device may make limitations only when the virtual object obviously move abnormally on the basis of the foregoing rough modeling result.

Certainly, in this embodiment, it may be determined, only on the basis of the height property of the block or with reference to other properties of the block, whether the displacement conforms to the preset rule. For example, in addition to the height property, a type property may be further set for the block. Specifically, in FIG. 2, the blocks A1, A2, A3, A8, A9, and B3 to B8 that are shown by white boxes may be set to a non-barring type, and the blocks B1, B2, and A4 to A7 that are shown by forward-slash boxes and back-slash boxes may be set to a barring type.

Figure 3:
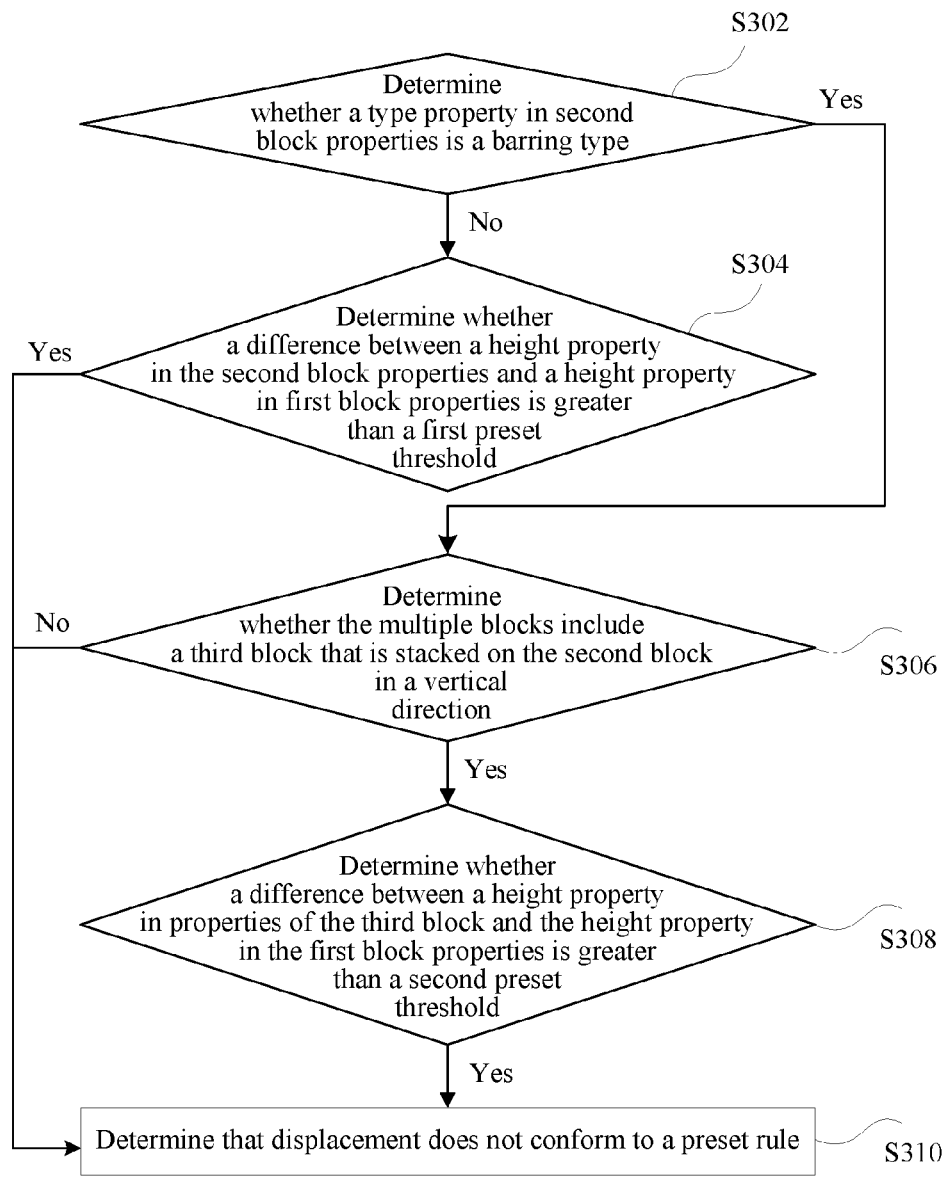
FIG. 3 is a schematic diagram showing displacement appropriateness determining according to an embodiment of the present invention.

In the foregoing scenario, it may be determined, by using determining logic shown in FIG. 3, whether displacement requested by the client conforms to a preset rule. By using moving routes 1, 2, and 3 of the virtual object in the space as examples, on these routes, a displacement request initiated by the client generally includes the following several displacement types.

1) When the virtual object moves in one block, for example, on the route 1, the displacement is displacement during which a starting point and an end point are both located in the block A1.

2) When the virtual object moves through adjacent and accessible blocks, for example, on the route 2, the displacement is displacement during which a starting point is located in the block B5 and an end point is located in the block B4.

3) When the virtual object moves through adjacent and inaccessible blocks, for example, on the route 3, the displacement is displacement during which a starting point is located in the block A8 and an end point is located in the block A7.

4) When the virtual object moves through adjacent blocks on different landform layers, for example, on the route 1, the displacement is displacement during which a starting point is located in the block A3 and an end point is located in the block A4.

For the type 1), according to the process shown in FIG. 3, because the block A1 serving as both the first block and the second block is not a barring type and a difference between height properties of the both is generally less than a first preset threshold, a result obtained in steps S302 and S304 is that the displacement conforms to the preset rule.

For the type 2), according to FIG. 3, because the block B4 serving as the second block is not a barring type and a difference between the height of the block B4 and the height of the block B5 serving as the first block is generally less than the first preset threshold, a result obtained in steps S302 and S304 is that the displacement conforms to the preset rule.

For the type 3), according to FIG. 3, because the block A7 serving as the second block is a barring type and the block B6 that is stacked on the block A7 exists, but a difference between the height of the block B6 and the height of the block A7 or A8 is generally greater than a second preset threshold, a result obtained in steps S302, S306, S308, and S310 is that the displacement does not conform to the preset rule.

For the type 4), according to FIG. 3, because the block A4 serving as the second block is a barring type and the block B3 that is stacked on the block A4 exists, but a difference between the height of the block B3 and the height of the block A4 or A3 is generally less than a second preset threshold, a result obtained in steps S302, S306, and S308 is that the displacement conforms to the preset rule.

In the foregoing manner, it is ensured that the virtual person can normally walk up to or walk down from the bridge, and the virtual person can be avoided from walking from the ground or a water surface under the bridge towards an inaccessible region of a pier. Certainly, it should be understood that, the foregoing embodiment is provided merely as an example, and is not a unique implementation manner of the present disclosure. For example, in this embodiment, for the type property of the block, the type "barring" may include a barring type and a boundary type, where the barring type indicates a completely inaccessible block. For example, in FIG. 2, the blocks A6 and A7 shown by back-slash boxes are defined as a boundary type, and the blocks A4, A5, B1, and B2 that are shown by forward-slash boxes are defined as a barring type, where the barring type may generally indicate that there is a third block that is stacked on and "communicated" with the block, and if there is the third block, for example, the block B3 for the block A4 and the block A3 for the block B2, it may be determined that the displacement is appropriate and conforms to the preset rule.

Figure 4:
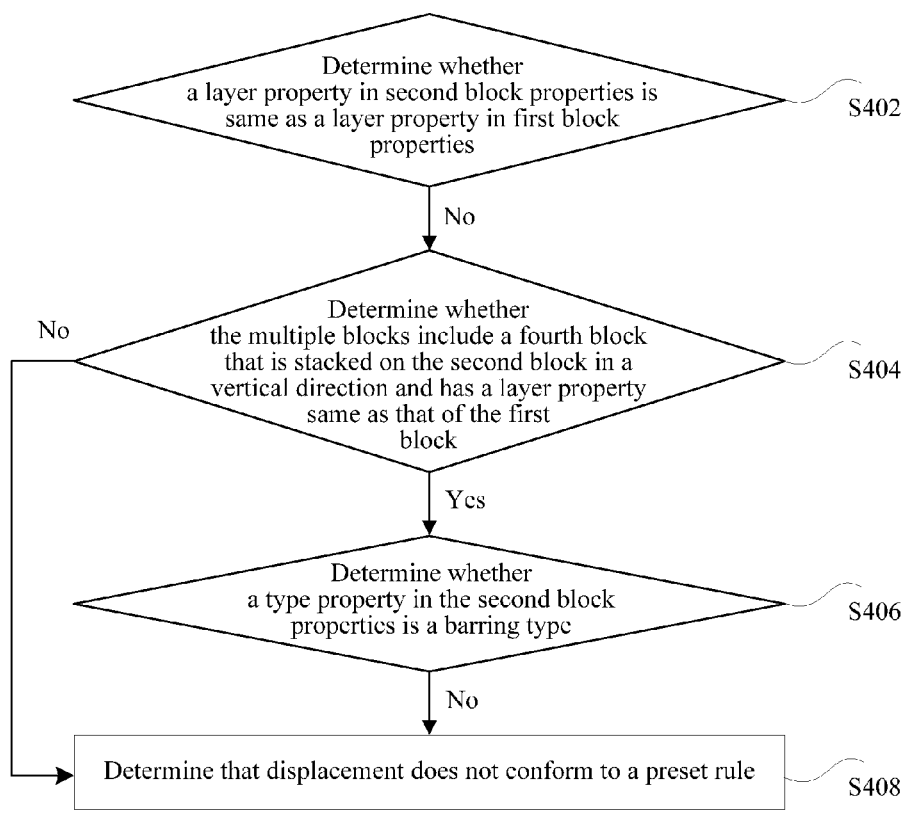
FIG. 4 is a schematic diagram showing another case of displacement appropriateness determining according to an embodiment of the present invention.

In addition, for further simplifying the model, in some embodiments of the present invention, determining logic shown in FIG. 4 may also be used.

As shown in FIG. 4, in this embodiment, a layer property of the block may further be used. For example, the blocks A1 to A9 that represent the ground in FIG. 2 may be defined as a first layer, and the blocks B1 to B8 that represent the arch bridge are defined as a second layer, where the definition of the layer may generally indicate landform layers in a virtual space, for example, the space above the bridge and the space below the bridge may be defined as two layers, and a staircase and the upper floor and the lower floor that are connected by the staircase may be defined as three layers.

As described in step S402, if displacement of the virtual person occurs on the same layer, it may be roughly determined that the displacement conforms to a preset rule. If displacement of the virtual person occurs between one layer and another layer, it may be determined that the two layers are communicated. As described in step S404, it is determined whether there is a communication relationship; it may be determined whether there is a fourth block that is stacked on the second block and belongs to the same layer with the first block, and if there is no fourth block, it may be determined that a developer does not design a "communication point", that is crossed during the displacement between two layers, at the position of the second block; and in this way, a result that the displacement does not conform to the preset rule is obtained. If there is the fourth block, it may be further determined, in step S406, whether the second block communicated with the fourth block is a barring type; if the second block is not the barring type, it may be considered that the second block is not a "communication point" designed by the developer, and a result that the displacement does not conform to the preset rule is obtained in step S408; and if the second block is the barring type, it may be determined that the second block is a "communication point" that is crossed during the displacement between two layers and designed by the developer, and therefore, a result that the displacement conforms to the preset rule may be obtained.

In the foregoing scenario, in FIG. 2, the virtual person may successively pass through the blocks A1, A2, A3, B3, B4, . . . , along the route 1, that is, in the model established for the region at the side of the terminal device, the first layer representing the ground is communicated with the block B3 at the block A4, so that the first layer is connected to the second layer representing the bridge. Similarly, the virtual person may also successively pass through the blocks B5, B4, B3, A3, A2, . . . , along the route 2, and the blocks A6 and A7 may also be defined as a boundary type or are not set, so that the first layer is not "communicated" with the second layer at this place, to avoid the virtual person to pass through.

It should be noted that, in the embodiment of the present invention, the terms "first" and "second" in the first block and the second block are merely for ease of description, which are used to distinguish, in the description, a block in which a starting point of the displacement is located from a block in which an end point of the displacement is located, but is not intended to limit the sequence of or the position relationship between the first block and the second block, and even the first block and the second block are not necessarily limited to two different ones in multiple blocks. For example, in the embodiment of the present invention, when the displacement requested by the client is small, the first block in which a starting point of the displacement is located and the second block in which an end point of the displacement is located are the same block, which does not affect implementation of the technical solution of the present disclosure and achievement of the technical effect thereof; therefore, the terms such as "first" and "second" in the embodiment of the present invention shall not be construed as a limitation to the present disclosure.

On the basis of the foregoing description, according to the processing method provided by the embodiment of the present invention, in step S106, when it is determined that the displacement requested by the client does not conform to the preset rule, a second message used by the client to refuse the displacement is sent to the client.

For example, as a feasible manner, in the embodiment of the present invention, after step S104, the foregoing processing method may further include:

S30: Update, if it is determined that the displacement conforms to the preset rule, a three-dimensional coordinate, that is carried in the first message, of an end point of the displacement to a position record.

Step S106 may include:

S32: Send a second message that carries the position record and instruction information to the client, where the instruction information is used to enable the client to reset the position of the virtual object according to the position record.

In the foregoing embodiments, the technical solution and the working principles of the present disclosure are described. It should be understood that, the foregoing embodiments are merely used to understand the present disclosure and are not considered as a limitation to the present disclosure.

It should be noted that, for the methods according to the foregoing embodiments, for purposes of simplicity of explanation, the methods are described as a combination of a series of actions, but it should be clear to persons skilled in the art that the present disclosure is not limited by the sequence of the actions, as some steps can, in accordance with the present disclosure, be performed in other sequences or concurrently. Next, persons skilled in the art should also know that, the embodiments described in the specification all fall within exemplary embodiments, and the related actions and modules are not necessarily required by the present disclosure.

Through the above description of the implementation, it is clear to persons skilled in the art that the present disclosure may be accomplished through software plus a necessary hardware platform, or completely through hardware, but in many cases the former is preferred implementation. Based on this, the technical solution of the present disclosure or the part that makes contributions to the prior art can be embodied in the form of a software product. The computer software product may be stored in a storage medium (such as a ROM/RAM, a magnetic disk or an optical disc), and contain several instructions to instruct computer equipment (which may be a mobile phone, a computer, a server, or network equipment) to perform the method described in the embodiments of the present invention.

Figure 5:
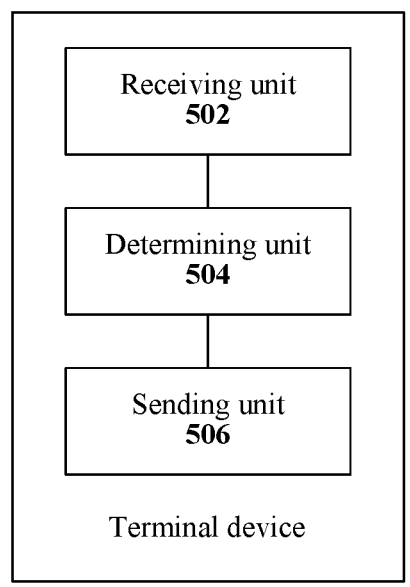
FIG. 5 is a schematic diagram of a terminal device according to an embodiment of the present invention.

According to an embodiment of the present invention, a terminal device for implementing the foregoing message processing method is further provided. As shown in FIG. 5, the terminal device includes:

1) a receiving unit 502, configured to receive a first message that carries displacement parameters and is sent by a client, the displacement parameters being generated by the client and used to indicate displacement of a virtual object in a virtual space;

2) a determining unit 504, configured to determine, according to the displacement parameters, whether the displacement conforms to a preset rule; and 3) a sending unit 506, configured to send, if it is determined that the displacement does not conform to the preset rule, a second message used by the client to refuse the displacement.

It should be noted that, one of problems to be solved by the technical solution of the present disclosure is to provide a terminal device, so as to restrict possible abnormal movement of a virtual object in a virtual space that is maintained by the terminal device and loaded by a client. The client may refer to a physical device that is connected to the terminal device and requests from the terminal device a service related to the virtual space and the virtual object, such as, a personal computer serving as a fixed terminal, or a smart phone or a tablet computer serving as a mobile terminal; or the client may also refer to a client application running on the physical device or a system thereof, such as, a game client, which does not affect understanding and implementation of the technical solution of the present disclosure and achievement of the technical effect of the technical solution; and the present disclosure is not limited thereto.

In the existing technology, modeling calculation of a virtual object in a virtual space is generally implemented by using a 3D engine. However, a traditional 3D engine is developed mainly for a standalone game client or a client game client, which is, in other words, developed mainly according to manifestation of a client. Therefore, the traditional 3D engine requires high-precision model calculation and a large calculation amount, for example, the traditional 3D engine generally outlines the virtual object by using a large number of polygons. Because collision detection is achieved on the basis of a model, if the traditional 3D engine is migrated to a terminal device and logic of the collision detection is achieved on the basis of the migration, multiple terminal device resources are occupied, which results in reduction in maintainability and a bearing capacity. For example, after some common physical engines are migrated to a terminal device, one B6 machine can only bear 500 to 600 users.

A concept of another existing solution is that related calculation logic is wholly set in a client, and the terminal device trusts the client completely or only performs limited verifications, for example, the terminal device moderately extracts some logic and also performs calculation, and then compares a calculation result with a result uploaded by the client, to determine whether the virtual object has an abnormal action. However, the detection manner based on sampling calculation cannot ensure reliability of the whole calculation logic. Therefore, the logic is easily used by a tag-on service, and moreover, normal operations of a user also likely cause an abnormal displacement result. In other words, in the existing solution, multiple terminal device resources need to be occupied to ensure appropriate movement of a virtual object, and cannot ensure reliability of movement logic and collision detection logic in the case of a reduced terminal device pressure.

To solve the foregoing problems, in the embodiment of the present invention, fine modeling calculation that determines image manifestation and occupies multiple processing resources and storage resources, and collision detection logic are implemented by a client, and the client uploads displacement parameters related to movement of the virtual object in the virtual space, to update data at the side of the terminal device. However, the terminal device does not completely trust information uploaded by the client, but processes, by using relatively unsophisticated detection logic, a first message that carries the displacement parameters and is uploaded by the client, further determines whether a displacement result calculated by the client conforms to a coarse preset rule, and when it is determined that the displacement result does not conform to the preset rule, refuses the displacement result calculated by the client.

As can be seen, in the embodiment of the present invention, the terminal device only needs to ensure "security" and "reliability" of movement logic of the virtual object in the virtual space, and does not need to ensure "realness" presented by collided images. In this way, without occupation of excessive terminal device resources, abnormal movement of the virtual object caused, for example, by malicious modification at the client is avoided, thereby solving the technical problem in the existing technology that multiple terminal device resources need to be occupied to ensure appropriate movement of the virtual object.

The technical solution and working principles of the present disclosure are described below with reference to the accompanying drawings and specific embodiments.

According to the terminal device provided by the embodiment of the present invention, by using the receiving unit 502, the terminal device may receive a first message that carries displacement parameters and is sent by a client, where the displacement parameters are generated by the client and used to indicate displacement of a virtual object in a virtual space.

In the embodiment of the present invention, because the displacement parameters are generated by the client, fine modeling calculation and collision logic detection may be implemented by using a traditional 3D engine running on the client. On such a basis, the client obtains, through calculation according to operating instructions input by a user, that necessary displacement parameters need to be further sent to the terminal device if the virtual object needs to move in the virtual space, so that the terminal device determines, according to the displacement parameters, whether the displacement of the virtual object conforms to a preset rule set by a game developer.

Specifically, the displacement parameters may generally include a parameter indicating a starting point position of the displacement and a parameter indicating an end point position of the displacement, and therefore the displacement may also be regarded as uploading of vector information. However, the present disclosure is not limited thereto. For example, in some embodiments of the present invention, the first message sent by the client may also only carry the parameter indicating an end point position of the displacement; in this way, the terminal device may determine, with reference to a position record stored in the terminal device and uploaded by the client in advance, how displacement that is requested by the client in current uploading is performed. In addition, in the embodiment of the present invention, a specific manner of receiving, by the terminal device, the first message sent by the client may be selected from manners known by a person skilled in the art, which is not described in detail herein by the present disclosure.

Certainly, the foregoing is merely exemplary description, and does not constitute any unnecessary limitation to the present disclosure. For example, in some embodiments of the present invention, the virtual space is not necessarily a three-dimensional space, and for the terminal device that maintains a two-dimensional scenario, an elaborate scenario description and unsophisticated detection logic may still be separated in implementation, and are respectively implemented by the client and the terminal device, to achieve effects of ensuring logic reliability and reducing a processing pressure of the terminal device. However, the present disclosure is not limited thereto.

Further, according to the terminal device provided by the embodiment of the present invention, the determining unit 504 may determine, according to the displacement parameters, whether displacement requested by a client order conforms to a preset rule. The preset rule is generally a rule that is set by a developer, a manager, or a maintainer of the virtual space and movement of the virtual object in the virtual space should obey. For example, for some virtual spaces that simulate reality, when a virtual person as the virtual object walks to a barrier in the virtual space, the virtual person cannot continue to move forward as usual, and therefore, one of formed preset rules may be that "the virtual object cannot continuously move towards the inside of a barrier when moving to the barrier" or "an end point of displacement requested by a client shall not fall inside a barrier".

It should be understood that, in the embodiment of the present invention, on the basis of related instructions and as an appropriate selection of a person skilled in the art, detection logic, for movement and collision feasibility, of which the sophistication is far lower than that at the side of the client may be generally set at the side of the terminal device. For example, generally, because a relatively fine "real" three-dimensional scenario does not need to be restored at the side of the terminal device, the terminal device does not need to perform a large amount of modeling calculation by using a traditional 3D engine and further does not need to implement complicated collision detection on the basis of a fine model. In the embodiment of the present invention, when it is determined whether the displacement requested by the client is appropriate, the modeling calculation may be completely simplified. That is, compared with the client, the terminal device does not need to ensure that the movement of the virtual object in the virtual space perfectly matches the acceptance level of the human vision, and only needs to ensure, through rough modeling calculation, that the virtual object does not move at excessively large deviation in the virtual space or a coarse virtual space.

For example, as a feasible implementation manner, the client can only upload a position of a central point of a virtual object, and does not need to upload an outline of the virtual object, that is, only upload starting point coordinates and end point coordinates of the central point of the virtual object. In such a manner, the terminal device can completely omit modeling for the virtual object, and by means of such improvement, the processing efficiency of the terminal device is obviously enhanced in maintaining a virtual space accommodating a large number of virtual objects.

Certainly, the foregoing is one of fundamental implementation manners of the present disclosure, and does not constitute a limitation to the present disclosure. For example, in some embodiments of the present invention, the landform in the virtual space may be further coarsened, for example, discretization processing is performed on a continuous curved surface serving as a boundary, to form a surface of a block shape, or the like.

As a more preferred manner, in the embodiment of the present invention, the determining unit 504 may include:

1) a search module, configured to search for first block properties and second block properties according to the displacement parameters;

2) an acquiring module, configured to acquire the first block properties and the second block properties from the displacement parameters; and 3) a determining module, configured to determine, according to the first block properties and the second block properties, whether the displacement conforms to the preset rule.

The first block properties are properties of a first block in which a starting point of the displacement is located, and the second block properties are properties of a second block in which an end point of the displacement is located. Multiple blocks including the first block and the second block are used to divide the virtual space in a horizontal direction, and the size of each of the multiple blocks is greater than a minimum displacement value of the virtual object in the virtual space.

In the foregoing manner, in the embodiment of the present invention, for processing logic of displacement that is performed by the terminal device and requested by the client, an object to be determined by the terminal device is further optimized from the position of a central point of the virtual object into blocks in which the virtual object is located, where the blocks are specifically a first block in which a starting point of the displacement requested by the client is located and a second block in which an end point of the displacement is located, and then the complicated displacement condition requested by the client is simplified into displacement from the first block to the second block; and finally, it is determined whether the simplified displacement conforms to the preset rule. In other words, in the embodiment of the present invention, before determining the displacement of the virtual object, the terminal device discretizes starting points of the displacement and end points of the displacement that are continuously distributed in the virtual space, thereby greatly reducing the calculation amount of movement feasibility calculation and collision detection calculation.

Specifically, in the embodiment of the present invention, the search module or the acquiring module may obtain the properties of the first block and the properties of the second block, which may be recorded as first block properties and second block properties; and then the determining module determines, according to the first block properties and the second block properties, whether the displacement requested by the client conforms to the preset rule. The block property may be height information of a block, or may also be barring information of a block, and a specific implementation manner thereof will be described in detail in a subsequent embodiment.

In the embodiment of the present invention, the search module may include:

1) a search sub-module, configured to search for data records corresponding to an identification item of the first block and use the data records as the first block properties, and search for data records corresponding to an identification item of the second block and use the data records as the second block properties, where the displacement parameters include the identification items and the identification items include block IDs and block coordinates.

In addition, the acquiring module may include:

1) an acquiring sub-module, configured to acquire the first block properties and the second block properties that are added by the client to the displacement parameters in advance.

In the embodiment of the present invention, the terminal device may store properties of all blocks in the virtual space in a database in advance, and after receiving a first message sent by the client, search for a corresponding data record according to a block ID or block coordinates, that are sent by the client, of the starting point of the displacement, thereby further simplifying the processing logic of the terminal device and accelerating the processing. These blocks may also be stored in the database in a coordinate sequence, so as to accelerate the search.

Certainly, in some embodiments of the present invention, the client may also directly add the block properties to the first message and send the first message to the terminal device, and in this way, a search operation is also transferred to the side of the client, thereby further reducing occupation of the terminal device resources.

More specifically, as an optional manner, in the embodiment of the present invention, the determining module may include:

1) a first determining sub-module, configured to determine whether a difference between a height property in the second block properties and a height property in the first block properties is greater than a first preset threshold, where a height property of any block in the multiple blocks indicates a height value that is preset for the block; and 2) a second determining sub-module, configured to determine, when the difference is greater than the preset threshold, that the displacement does not conform to the preset rule.

In the embodiment of the present invention, one block may only correspond to one height property. That is, no matter what position, in a certain block, a starting point or an end point of the displacement is located, when the terminal device determines the displacement, the same height property of the block is used in all cases. When it is determined that a difference between a height of the second block in which the end point of the displacement is located and a height of the first block in which the starting point of the displacement is located exceeds a certain preset threshold, it may be determined that occurrence of the displacement is impossible, and correspondingly, in a three-dimensional scenario, the virtual object cannot climb up to an excessively high position during one movement.

Correspondingly, in the embodiment of the present invention, the terminal device may further include:

1) an acquiring unit, configured to acquire an average height value of a region that corresponds to any block and is obtained by dividing the virtual space; and 2) a setting unit, configured to set the average height value as a height property of the block.

In this manner, a block corresponding to a certain landform region, such as a slope, in the virtual space is fitted into an average height value of all coordinates on the slope or an average value of multiple coordinates on the Z axis, and then the average height value or the average value is used as a height property of the block, so that the condition is relatively close to an actual condition in a virtual world.

In addition, as another optional manner, in the embodiment of the present invention, the determining module may further include:

1) a third determining sub-module, configured to determine whether a type property in the second block properties is a barring type; and 2) a fourth determining sub-module, configured to determine, when the type property is the barring type, that the displacement does not conform to the preset rule.

In the embodiment of the present invention, when a region, corresponding to the second block, in the virtual space is a barring area or a region that the virtual object is forbidden to pass through, a type property of the second block may be preset as a barring type; or otherwise, may be preset as a non-barring type. In this manner, the collision detection logic that keeps the virtual object out of a barrier can be achieved.

Further, in the embodiment of the present invention, the fourth determining sub-module may further include:

1) a fifth determining sub-module, configured to determine whether the multiple blocks include a third block that is stacked on the second block in a vertical direction;

2) a sixth determining sub-module, configured to determine, if it is determined that there is the third block, whether a difference between a height property in properties of the third block and the height property in the first block properties is greater than a second preset threshold, where a height property corresponding to any block in the multiple blocks indicates a height value that is preset for the block; and a seventh determining sub-module, configured to determine, if it is determined that the difference is greater than the second preset threshold, that the displacement does not conform to the preset rule; and 3) an eighth determining sub-module, configured to determine, if it is determined that there is no third block, that the displacement does not conform to the preset rule.

In the foregoing scenario, it is equivalent that accessible landform regions, in a virtual space, indicated by the blocks in the horizontal direction are spliced, and when the virtual object requests to move to the second block of a barring type, it may be further determined whether there is a third block that is stacked on and "communicated" with the second block. For example, in some embodiments of the present invention, the third block may be laid on top of the second block, and the second block and the third block are separately on a different block layer, so that the virtual object can move through blocks on different block layers. In this manner, the terminal device can only store blocks that correspond to one layer or multiple layers of accessible landform surfaces and boundary regions between different layers of landform surfaces in the virtual space, thereby further reducing occupation of the terminal device resources, and accelerating the search for the block properties.

The technical solution of the present disclosure is described in detail below with reference to the accompanying drawings and more specific embodiments. For example, as an optional manner, in an embodiment of the present invention, a block division manner shown in FIG. 2 may be used. FIG. 2 is a longitudinal sectional diagram presented after the side of the terminal device divides a region near an "arch bridge" in a virtual space into blocks.

As shown in FIG. 2, in this embodiment, the region representing the "ground" in the virtual space is divided into horizontally arranged blocks A1 to A9, and the region representing the "arch bridge" in the virtual space is divided into blocks B1 to B8 also in the horizontal direction. In the foregoing scenario, according to the processing method provided by the embodiment of the present invention, after receiving a message that is sent by the client and used to request the virtual object to move in the space, the terminal device may determine a specific first block from which the virtual object that moves in the region shown in FIG. 2 moves and a specific second block to which the virtual object moves. For example, when a virtual person as the virtual object needs to walk rightwards from the ground at the left side in FIG. 2 up to the bridge, a starting point of displacement, initiated by the client, of the virtual person may be located in the block A3, and an end point of the displacement may be located in the block B3; in this way, the terminal device may determine, according to properties of the block A3 and properties of the block B3, whether the displacement from A3 to B3 conforms to a preset rule, and then determine, according to the foregoing determining result, whether occurrence of the current displacement initiated by the client is possible.

In this embodiment, the region in the virtual space shown in FIG. 2 is discretized into multiple blocks of large size, and landform information of the region of this part is simulated according to pre-defined properties of these blocks, which is equivalent that a model of a coarse virtual space is established at the side of the terminal device; and then it may be determined, according to a modeling result, whether movement of the virtual person is appropriate. For example, heights of the blocks B1 to B8 that are used to simulate the bridge are generally higher than the blocks A1 to A8 that are used to simulate the ground, and the height of the block B8 at the center of the arch bridge is higher than heights of the blocks B1 to B3 at one side of the arch bridge. If the preset rule sets that a different between a height property of the second block and a height property of the first block is less than or equal to a certain threshold, when the client requests to initiate movement, similar to "walking up to the bridge", of the virtual person, it is determined whether the displacement conforms to the preset rule, to limit the virtual person with an insufficient "climbing capability" to walk from one side of the bridge to the center of the bridge. This movement limitation generally cannot completely achieve a movement limitation effect of the "real" bridge with a relatively smooth floor in the virtual space on a person walking on the bridge, which however does not affect movement manifestation presented by the client to the user; because more sophisticated movement logic and collision detection logic are achieved at the side of the client, the side of the terminal device may make limitations only when the virtual object obviously move abnormally on the basis of the foregoing rough modeling result.

Certainly, in this embodiment, it may be determined, only on the basis of the height property of the block or with reference to other properties of the block, whether the displacement conforms to the preset rule. For example, in addition to the height property, a type property may be further set for the block. Specifically, in FIG. 2, the blocks A1, A2, A3, A8, A9, and B3 to B8 that are shown by white boxes may be set to a non-barring type, and the blocks B1, B2, and A4 to A7 that are shown by forward-slash boxes and back-slash boxes may be set to a barring type.

In the foregoing scenario, it may be determined, by using determining logic shown in FIG. 3, whether displacement requested by the client conforms to a preset rule. By using moving routes 1, 2, and 3 of the virtual object in the space as examples, on these routes, a displacement request initiated by the client generally includes the following several displacement types.

1) When the virtual object moves in one block, for example, on the route 1, the displacement is displacement during which a starting point and an end point are both located in the block A1.

2) When the virtual object moves through adjacent and accessible blocks, for example, on the route 2, the displacement is displacement during which a starting point is located in the block B5 and an end point is located in the block B4.

3) When the virtual object moves through adjacent and inaccessible blocks, for example, on the route 3, the displacement is displacement during which a starting point is located in the block A8 and an end point is located in the block A7.

4) When the virtual object moves through adjacent blocks on different landform layers, for example, on the route 1, the displacement is displacement during which a starting point is located in the block A3 and an end point is located in the block A4.

For the type 1), according to the process shown in FIG. 3, because the block A1 serving as both the first block and the second block is not a barring type and a difference between height properties of the both is generally less than a first preset threshold, a result obtained in steps S302 and S304 is that the displacement conforms to the preset rule.

For the type 2), according to FIG. 3, because the block B4 serving as the second block is not a barring type and a difference between the height of the block B4 and the height of the block B5 serving as the first block is generally less than the first preset threshold, a result obtained in steps S302 and S304 is that the displacement conforms to the preset rule.

For the type 3), according to FIG. 3, because the block A7 serving as the second block is a barring type and the block B6 that is stacked on the block A7 exists, but a difference between the height of the block B6 and the height of the block A7 or A8 is generally greater than a second preset threshold, a result obtained in steps S302, S306, S308, and S310 is that the displacement does not conform to the preset rule.

For the type 4), according to FIG. 3, because the block A4 serving as the second block is a barring type and the block B3 that is stacked on the block A4 exists, but a difference between the height of the block B3 and the height of the block A4 or A3 is generally less than a second preset threshold, a result obtained in steps S302, S306, and S308 is that the displacement conforms to the preset rule.

In the foregoing manner, it is ensured that the virtual person can normally walk up to or walk down from the bridge, and the virtual person can be avoided from walking from the ground or a water surface under the bridge towards an inaccessible region of a pier. Certainly, it should be understood that, the foregoing embodiment is provided merely as an example, and is not a unique implementation manner of the present disclosure. For example, in this embodiment, for the type property of the block, the type "barring" may include a barring type and a boundary type, where the barring type indicates a completely inaccessible block. For example, in FIG. 2, the blocks A6 and A7 shown by back-slash boxes are defined as a boundary type, and the blocks A4, A5, B1, and B2 that are shown by forward-slash boxes are defined as a barring type, where the barring type may generally indicate that there is a third block that is stacked on and "communicated" with the block, and if there is the third block, for example, the block B3 for the block A4 and the block A3 for the block B2, it may be determined that the displacement is appropriate and conforms to the preset rule.

In addition, for further simplifying the model, in some embodiments of the present invention, determining logic shown in FIG. 4 may also be used.

As shown in FIG. 4, in this embodiment, a layer property of the block may further be used. For example, the blocks A1 to A9 that represent the ground in FIG. 2 may be defined as a first layer, and the blocks B1 to B8 that represent the arch bridge are defined as a second layer, where the definition of the layer may generally indicate landform layers in a virtual space, for example, the space above the bridge and the space below the bridge may be defined as two layers, and a staircase and the upper floor and the lower floor that are connected by the staircase may be defined as three layers.

As described in step S402, if displacement of the virtual person occurs on the same layer, it may be roughly determined that the displacement conforms to a preset rule. If displacement of the virtual person occurs between one layer and another layer, it may be determined that the two layers are communicated. As described in step S404, it is determined whether there is a communication relationship; it may be determined whether there is a fourth block that is stacked on the second block and belongs to the same layer with the first block, and if there is no fourth block, it may be determined that a developer does not design a "communication point", that is crossed during the displacement between two layers, at the position of the second block; and in this way, a result that the displacement does not conform to the preset rule is obtained. If there is the fourth block, it may be further determined, in step S406, whether the second block communicated with the fourth block is a barring type; if the second block is not the barring type, it may be considered that the second block is not a "communication point" designed by the developer, and a result that the displacement does not conform to the preset rule is obtained in step S408; and if the second block is the barring type, it may be determined that the second block is a "communication point" that is crossed during the displacement between two layers and designed by the developer, and therefore, a result that the displacement conforms to the preset rule may be obtained.

In the foregoing scenario, in FIG. 2, the virtual person may successively pass through the blocks A1, A2, A3, B3, B4, . . . , along the route 1, that is, in the model established for the region at the side of the terminal device, the first layer representing the ground is communicated with the block B3 at the block A4, so that the first layer is connected to the second layer representing the bridge. Similarly, the virtual person may also successively pass through the blocks B5, B4, B3, A3, A2, . . . , along the route 2, and the blocks A6 and A7 may also be defined as a boundary type or are not set, so that the first layer is not "communicated" with the second layer at this place, to avoid the virtual person to pass through.

As can be known from the foregoing description, in the embodiment of the present invention, the determining module may include:

1) a ninth determining sub-module, configured to determine whether a layer property in the second block properties is same as a layer property in the first block properties;

2) a tenth determining sub-module, configured to determine, if it is determined that the layer properties are different, whether the multiple blocks include a fourth block that is stacked on the second block in a vertical direction and has a layer property same as that of the first block; and 3) an eleventh determining sub-module, configured to determine, if there is no fourth block, that the displacement does not conform to the preset rule.

The eleventh determining sub-module may include:

1) a twelfth determining sub-module, configured to determine whether a type property of the fourth block is a barring type; and 2) a thirteenth determining sub-module, configured to determine, if it is determined that the type property is not the barring type, that the displacement does not conform to the preset rule.

It should be noted that, in the embodiment of the present invention, the terms "first" and "second" in the first block and the second block are merely for ease of description, which are used to distinguish, in the description, a block in which a starting point of the displacement is located from a block in which an end point of the displacement is located, but is not intended to limit the sequence of or the position relationship between the first block and the second block, and even the first block and the second block are not necessarily limited to two different ones in multiple blocks. For example, in the embodiment of the present invention, when the displacement requested by the client is small, the first block in which a starting point of the displacement is located and the second block in which an end point of the displacement is located are the same block, which does not affect implementation of the technical solution of the present disclosure and achievement of the technical effect thereof; therefore, the terms such as "first" and "second" in the embodiment of the present invention shall not be construed as a limitation to the present disclosure.

On the basis of the foregoing description, according to the terminal device provided by the embodiment of the present invention, a sending unit 506 may send, when it is determined that the displacement requested by the client does not conform to the preset rule, a second message used by the client to refuse the displacement to the client.

For example, as a feasible manner, in the embodiment of the present invention, in addition to the determining unit 504, the foregoing terminal device may further include:

1) an update unit, configured to update, if it is determined that the displacement conforms to the preset rule, a three-dimensional coordinate, that is carried in the first message, of an end point of the displacement to a position record.

The sending unit 506 may include:

1) a sending module, configured to send a second message that carries the position record and instruction information to the client, where the instruction information is used to enable the client to reset the position of the virtual object according to the position record.

In the foregoing embodiments, the technical solution and the working principles of the present disclosure are described. It should be understood that, the foregoing embodiments are merely used to understand the present disclosure and are not considered as a limitation to the present disclosure.

The sequence numbers of the preceding embodiments of the present invention are merely for description purpose but do not indicate the preference of the embodiments.

In the embodiments of the present invention, description for the embodiments has its own emphasis, and a part without being described in detail in a certain embodiment can be obtained with reference to relevant description in other embodiments.

In the several embodiments provided by the present application, it should be noted that, the disclosed terminal device and client can be implemented in other manners. The apparatus embodiments described above are merely illustrative, for example, the units of the apparatus are divided from the perspective of logical functions only and may be divided in a different way in practical application, for example, multiple units or components may be combined or integrated into another system, or some features can be omissible or not executed. Besides, the coupling, direct coupling or communication connection illustrated or discussed herein may be implemented through indirect coupling or communication connection between interfaces, units, or modules, and may be electronic or in other forms.

Units described as separate components may be or may not be physically separated. Components shown as units may be or may not be physical units, that is, may be located in one place, or may also be distributed to a plurality of network units. Some or all of the units may be selected to achieve the objective of the solution of the embodiments according to actual requirements.

In addition, the functional modules in the embodiments of the present invention may be integrated into one processing unit, or each of the modules may exist alone physically, or two or more modules may be integrated into one unit. The integrated unit may be implemented in the form of hardware, or may be implemented in the form of a software functional unit.

The functional modules in the embodiments may be located in one terminal or network node, or may be distributed on multiple terminals or network nodes. Based on this, the technical solution of the present disclosure, the part that makes contributions to the prior art, or all or a part of the technical solution can be embodied in the form of a software product. The computer software product is stored in a storage medium, and contain several instructions to instruct computer equipment (for example, a personal computer, a terminal device, or network equipment) to perform all or some steps of the method described in the embodiments of the present invention. The above storage medium includes any medium that can store program code, such as a USB flash disk, a read-only memory (ROM), a random access memory (RAM), a removable hard disk, a magnetic disk, or an optical disc.

The foregoing descriptions are merely preferred embodiments of the present invention. It should be noted that a person of ordinary skill in the art may further make variations and improvements without departing from the conception of the present disclosure, and these all fall within the protection scope of the present disclosure.

What is claimed is:

1. A message processing method, comprising:
   providing, at a terminal device, one or more processors and memory storing programs executed by the one or more processors;
   receiving a first message that carries displacement parameters and is sent by a client, the displacement parameters being generated by the client and used to indicate displacement of a virtual object in a virtual space;
   determining, according to the displacement parameters, whether the displacement conforms to a preset rule; and
   sending, if the displacement does not conform to the preset rule, a second message used by the client to refuse the displacement of the virtual object in the virtual space,
   wherein the method further comprises:
   coarsening landform in the virtual space by performing discretization processing on a continuous curved surface serving as a boundary of the landform to form multiple blocks corresponding to the landform,
   wherein the determining, according to the displacement parameters, whether the displacement conforms to the preset rule comprises:
   searching for first block properties and second block properties according to the displacement parameters;
   acquiring the first block properties and the second block properties from the displacement parameters; and
   determining, according to the first block properties and the second block properties, whether the displacement conforms to the preset rule,
   wherein the first block properties are properties of a first block in which a starting point of the displacement is located, the second block properties are properties of a second block in which an end point of the displacement is located,
   wherein before the determining, according to the first block properties and the second block properties, whether the displacement conforms to the preset rule, the method further comprises:
   discretizing the starting point and the end point of the displacement in the virtual space into the blocks such that the starting point of the displacement is represented by the first block and the end point of the displacement is represented by the second block, wherein the size of each of the blocks is greater than a minimum moving distance of the virtual object in the virtual space,
   wherein the determining, according to the first block properties and the second block properties, whether the displacement conforms to the preset rule comprises:
   determining, according to the first block properties and the second block properties, whether the displacement from the first block to the second block conforms to the preset rule.

2. The method according to claim 1, wherein the determining, according to the first block properties and the second block properties, whether the displacement conforms to the preset rule comprises:
   determining whether a difference between a height property in the second block properties and a height property in the first block properties is greater than a first preset threshold, wherein a height property of any block in the multiple blocks indicates a height value that is preset for the block; and
   determining, if the difference is greater than the first preset threshold, that the displacement does not conform to the preset rule.

3. The method according to claim 2, wherein before the receiving a first message that carries displacement parameters and is sent by a client, the method further comprises:
   acquiring an average height value of a region that corresponds to any block and is obtained by dividing the virtual space; and
   setting the average height value as a height property of the block.

4. The method according to claim 1, wherein the determining, according to the first block properties and the second block properties, whether the displacement conforms to the preset rule comprises:
   determining whether a type property in the second block properties is a barring type; and
   determining, if the type property in the second block properties is the barring type, that the displacement does not conform to the preset rule.

5. The method according to claim 4, wherein the determining, if the type property in the second block properties is the barring type, that the displacement does not conform to the preset rule comprises:
   determining whether the multiple blocks comprise a third block that is stacked on the second block in a vertical direction;

determining, if there is the third block, whether a difference between a height property in properties of the third block and the height property in the first block properties is greater than a second preset threshold, wherein a height property corresponding to any block in the multiple blocks indicates a height value that is preset for the block; and determining, if the difference is greater than the second preset threshold, that the displacement does not conform to the preset rule; and determining, if there is no third block, that the displacement does not conform to the preset rule.

6. The method according to claim 1, wherein the determining, according to the first block properties and the second block properties, whether the displacement conforms to the preset rule comprises:
   determining whether a layer property in the second block properties is same as a layer property in the first block properties;
   determining, if the layer properties are different, whether the multiple blocks comprise a fourth block that is stacked on the second block in a vertical direction and has a layer property same as that of the first block; and
   determining, if there is no fourth block, that the displacement does not conform to the preset rule.

7. The method according to claim 6, wherein after it is determined that there is the fourth block, the determining that the displacement does not conform to the preset rule comprises:
   determining whether a type property of the fourth block is a barring type; and
   determining, if the fourth block is not the barring type, that the displacement does not conform to the preset rule.

8. The method according to claim 1, wherein
   the searching for first block properties and second block properties according to the displacement parameters comprises: searching for data records corresponding to an identification item of the first block and using the data records as the first block properties, and searching for data records corresponding to an identification item of the second block and using the data records as the second block properties, wherein the displacement parameters comprise the identification items; and
   the acquiring the first block properties and the second block properties from the displacement parameters comprises: acquiring the first block properties and the second block properties that are added by the client to the displacement parameters in advance.

9. The method according to any one of claim 1, wherein after the determining, according to the displacement parameters, whether the displacement conforms to a preset rule, the method further comprises: updating, if it is determined that the displacement conforms to the preset rule, a three-dimensional coordinate, that is carried in the first message, of an end point of the displacement to a position record; and
   the sending a second message used by the client to refuse the displacement comprises: sending a second message that carries the position record and instruction information to the client, wherein the instruction information is used to enable the client to reset the position of the virtual object according to the position record.

10. A terminal device, comprising:
one or more processors;
a memory; and
one or more program modules stored in the memory and executed by the one or more processors, the one or more program modules comprising:
   a receiving unit, configured to receive a first message that carries displacement parameters and is sent by a client, the displacement parameters being generated by the client and used to indicate displacement of a virtual object in a virtual space;
   a determining unit, configured to determine, according to the displacement parameters, whether the displacement conforms to a preset rule; and
   a sending unit, configured to send, if the displacement does not conform to the preset rule, a second message used by the client to refuse the displacement,
   wherein the one or more program modules are further configured to:
   coarsen landform in the virtual space by performing discretization processing on a continuous curved surface serving as a boundary of the landform to form multiple blocks corresponding to the landform,
   wherein the determining unit comprises:
   a search module, configured to search for first block properties and second block properties according to the displacement parameters; and an acquiring module, configured to acquire the first block properties and the second block properties from the displacement parameters; and
   a determining module, configured to determine, according to the first block properties and the second block properties, whether the displacement conforms to the preset rule,
   wherein the first block properties are properties of a first block in which a starting point of the displacement is located, the second block properties are properties of a second block in which an end point of the displacement is located,
   wherein the one or more program modules are further configured to:
   discretize the starting point and the end point of the displacement in the virtual space into the blocks such that the starting point of the displacement is represented by the first block and the end point of the displacement is represented by the second block, wherein the size of each of the blocks is greater than a minimum moving distance of the virtual object in the virtual space,
   wherein the determining module is further configured to:
   determine, according to the first block properties and the second block properties, whether the displacement from the first block to the second block conforms to the preset rule.

11. The terminal device according to claim 10, wherein the determining module comprises:
   a first determining sub-module, configured to determine whether a difference between a height property in the second block properties and a height property in the first block properties is greater than a first preset threshold, wherein a height property of any block in the multiple blocks indicates a height value that is preset for the block; and
   a second determining sub-module, configured to determine, when the difference is greater than the first preset threshold, that the displacement does not conform to the preset rule.

12. The terminal device according to claim 11, wherein the terminal device further comprises:

an acquiring unit, configured to acquire an average height value of a region that corresponds to any block and is obtained by dividing the virtual space; and a setting unit, configured to set the average height value as a height property of the block.

13. The terminal device according to claim 10, wherein the determining module comprises:

a third determining sub-module, configured to determine whether a type property in the second block properties is a barring type; and a fourth determining sub-module, configured to determine, when the type property is the barring type, that the displacement does not conform to the preset rule.

14. The terminal device according to claim 13, wherein the fourth determining sub-module comprises:

a fifth determining sub-module, configured to determine whether the multiple blocks comprise a third block that is stacked on the second block in a vertical direction;

a sixth determining sub-module, configured to determine, if it is determined that there is the third block, whether a difference between a height property in properties of the third block and the height property in the first block properties is greater than a second preset threshold, wherein a height property corresponding to any block in the multiple blocks indicates a height value that is preset for the block; and a seventh determining sub-module, configured to determine, if it is determined that the difference is greater than the second preset threshold, that the displacement does not conform to the preset rule; and an eighth determining sub-module, configured to determine, if it is determined that there is no third block, that the displacement does not conform to the preset rule.

15. The terminal device according to claim 10, wherein the determining module comprises:

a ninth determining sub-module, configured to determine whether a layer property in the second block properties is same as a layer property in the first block properties;

a tenth determining sub-module, configured to determine, if it is determined that the layer properties are different, whether the multiple blocks comprise a fourth block that is stacked on the second block in a vertical direction and has a layer property same as that of the first block; and an eleventh determining sub-module, configured to determine, if there is no fourth block, that the displacement does not conform to the preset rule.

16. The terminal device according to claim 15, wherein the eleventh determining sub-module comprises:

a twelfth determining sub-module, configured to determine whether a type property of the fourth block is a barring type; and a thirteenth determining sub-module, configured to determine, if it is determined that the type property is not the barring type, that the displacement does not conform to the preset rule.

17. The terminal device according to claim 10, wherein the search module comprises: a search sub-module, configured to search for data records corresponding to an identification item of the first block and use the data records as the first block properties, and search for data records corresponding to an identification item of the second block and use the data records as the second block properties, wherein the displacement parameters comprise the identification items, and the identification items comprise block IDs and block coordinates; and the acquiring module comprises: an acquiring sub-module, configured to acquire the first block properties and the second block properties that are added to the displacement parameters by the client in advance.

18. The terminal device according to any one of claim 10, wherein the terminal device further comprises: an update unit, configured to update, if it is determined that the displacement conforms to the preset rule, a three-dimensional coordinate, that is carried in the first message, of an end point of the displacement to a position record; and the sending unit comprises: a sending module, configured to send a second message that carries the position record and instruction information to the client, wherein the instruction information is used to enable the client to reset the position of the virtual object according to the position record.

* * * * *